United States Patent
Fox et al.

(10) Patent No.: US 12,451,119 B2
(45) Date of Patent: Oct. 21, 2025

(54) SYSTEMS AND METHODS FOR EMPLOYING ALTERNATE SPELLINGS FOR IMPROVING THE RECOGNITION OF RARE WORDS

(71) Applicant: Rev.com, Inc., San Francisco, CA (US)

(72) Inventors: Jennifer Drexler Fox, Austin, TX (US); Danny Chen, Austin, TX (US); Natalie Delworth, Austin, TX (US)

(73) Assignee: Rev.com, Inc., San Francisco, CA (US)

( * ) Notice: Subject to any disclaimer, the term of this patent is extended or adjusted under 35 U.S.C. 154(b) by 479 days.

(21) Appl. No.: 17/656,757

(22) Filed: Mar. 28, 2022

(65) Prior Publication Data

US 2023/0326450 A1   Oct. 12, 2023

(51) Int. Cl.

| | |
|---|---|
| *G10L 15/06* | (2013.01) |
| *G06F 40/284* | (2020.01) |
| *G06F 40/47* | (2020.01) |
| *G10L 15/16* | (2006.01) |
| *G10L 15/193* | (2013.01) |
| *G10L 15/22* | (2006.01) |

(52) U.S. Cl.
CPC .......... *G10L 15/063* (2013.01); *G06F 40/284* (2020.01); *G06F 40/47* (2020.01); *G10L 15/16* (2013.01); *G10L 15/193* (2013.01); *G10L 15/22* (2013.01)

(58) Field of Classification Search
CPC ..... G10L 15/063; G10L 15/22; G10L 15/193; G10L 15/16; G06F 40/284; G06F 40/47
See application file for complete search history.

(56) References Cited

U.S. PATENT DOCUMENTS

| | | | |
|---|---|---|---|
| 2016/0203819 A1* | 7/2016 | Ma | G06F 40/289 |
| | | | 704/235 |
| 2017/0148431 A1* | 5/2017 | Catanzaro | G10L 15/16 |
| 2017/0323638 A1* | 11/2017 | Malinowski | G10L 15/193 |
| 2018/0025723 A1* | 1/2018 | Nagao | G10L 15/193 |
| | | | 704/254 |
| 2018/0233134 A1* | 8/2018 | Yoon | G10L 15/193 |
| 2019/0139540 A1* | 5/2019 | Kanda | G10L 15/19 |

FOREIGN PATENT DOCUMENTS

| | | | | |
|---|---|---|---|---|
| CN | 108417202 B | * | 9/2020 | G10L 15/02 |
| WO | WO-2019219968 A1 | * | 11/2019 | G06K 9/00281 |

* cited by examiner

*Primary Examiner* — Mohammad K Islam
(74) *Attorney, Agent, or Firm* — Haynes and Boone, LLP

(57) ABSTRACT

A method of adding a custom vocabulary to a transcription system includes receiving a custom vocabulary at an ASIRW module. The method further includes tokenizing the custom vocabulary with the ASIRW module. The method further includes creating a new WFST (weighted finite-state transducer) with the ASIRW module. The method further includes transcribing audio using the new WFST with the ASIRW module. The tokenizing includes performing a translation model on each word of the custom vocabulary.

18 Claims, 3 Drawing Sheets

SYSTEMS AND METHODS FOR EMPLOYING ALTERNATE SPELLINGS FOR IMPROVING THE RECOGNITION OF RARE WORDS

BACKGROUND

In speech recognition, uncommon words are less likely to be recognized correctly. It may be more important to customers that these uncommon words, especially first and last names, company names, domain-specific terminology, are recognized correctly. Therefore, it may be desirable to include the ability to include custom vocabulary in the recognition of speech.

BRIEF SUMMARY

In one embodiment, a method of adding a custom vocabulary to a transcription system includes receiving a custom vocabulary at an ASIRW module. The method further includes tokenizing the custom vocabulary with the ASIRW module. The method further includes creating a new WFST (weighted finite-state transducer) with the ASIRW module. The method further includes transcribing audio using the new WFST with the ASIRW module. In one alternative, the tokenizing includes performing a translation model on each word of the custom vocabulary. In another alternative, the custom vocabulary includes phrases. Alternatively, the tokenizing includes creating predicted tokenizations for alternate spellings of the custom vocabulary. In another alternative, the new WFST includes tokenizations for every word in a lexicon, plus tokenizations for the custom vocabulary, plus the predicted tokenizations for the alternate spellings of the custom vocabulary. Alternatively, the creating the new WFST includes running CTC (connectionist temporal classification) decoding.

In one embodiment, a system for adding a custom vocabulary to a transcription system includes a ASIRW module executing code and configured to: receive a custom vocabulary at the ASIRW module. The ASIRW module is further configured to tokenize the custom vocabulary with the ASIRW module. The ASIRW module is further configured to create a new WFST (weighted finite-state transducer) with the ASIRW module. The ASIRW module is further configured to transcribe audio using the new WFST with the ASIRW module. In one alternative, the tokenizing includes performing a translation model on each word of the custom vocabulary. In another alternative, the custom vocabulary includes phrases. Alternatively, the tokenizing includes creating predicted tokenizations for alternate spellings of the custom vocabulary. In another alternative, the new WFST includes tokenizations for every word in a lexicon, plus tokenizations for the custom vocabulary, plus the predicted tokenizations for the alternate spellings of the custom vocabulary. Alternatively, the creating the new WFST includes running CTC (connectionist temporal classification) decoding.

In one embodiment, a system for adding a custom vocabulary to a transcription system includes a ASIRW module executing code and configured to: receive a custom vocabulary at the ASIRW module. The ASIRW module is further configured to tokenize the custom vocabulary with the ASIRW module including performing a translation model on each word of the custom vocabulary. The ASIRW module is further configured to create a new WFST (weighted finite-state transducer) with the ASIRW module. The new WFST includes tokenizations for every word in a lexicon, plus tokenizations for the custom vocabulary, plus the predicted tokenizations for the alternate spellings of the custom vocabulary. The ASIRW module is further configured to transcribe audio using the new WFST with the ASIRW module.

In one embodiment, a non-transitory digital storage medium having a computer program stored thereon to perform a method of adding a custom vocabulary to a transcription system, includes receiving a custom vocabulary at an ASIRW module. The method further includes tokenizing the custom vocabulary with the ASIRW module. The method further includes creating a new WFST (weighted finite-state transducer) with the ASIRW module. The method further includes transcribing audio using the new WFST with the ASIRW module.

In one embodiment, a method of alternative spelling training includes providing a ground-truth text and providing ASR-generated text. The method further includes aligning the ground-truth text and the ASR-generated text with a text alignment tool. The method further includes generating error pairs from the aligning. The method further includes filtering the error pairs according to uncommon words to create filtered error pairs. The method further includes adding the filtered error pairs to the translation model training along with the previously existing training configuration files, to create a trained translation model. The method further includes using the trained translation model to generate a transcript from an audio signal. Alternatively, the ground-truth text results resulting from a live user creating a transcription for the audio signal including words. In another alternative, the ASR-generated text results from automatic speech recognition.

In another embodiment, a system of alternative spelling training includes an alternative spelling training module executing code and configured to: receive a ground-truth text and receive ASR-generated text. The alternative spelling training module further aligns the ground-truth text and the ASR-generated text with a text alignment tool. The alternative spelling training module further generates error pairs from the aligning. The alternative spelling training module further filters the error pairs according to uncommon words to create filtered error pairs. The alternative spelling training module further adds the filtered error pairs to the translation model training along with the previously existing training configuration files, to create a trained translation model. The alternative spelling training module further generates a transcript from an audio signal using the trained translation model.

DETAILED DESCRIPTION

Figure 1:
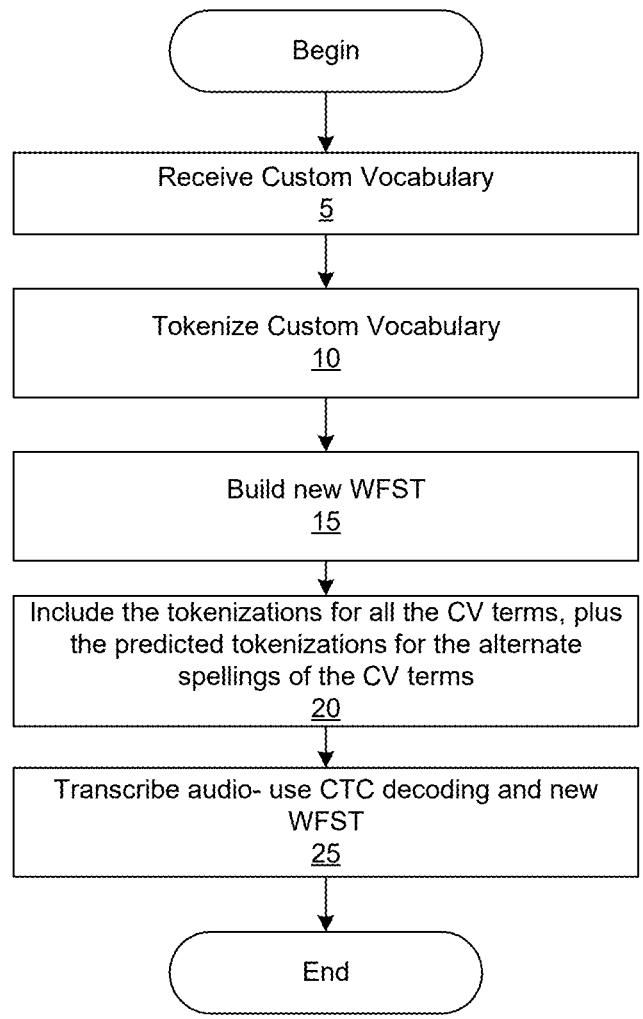
FIG. 1 shows a flowchart for one embodiment of an ASIRW system/method.

Certain terminology is used herein for convenience only and is not to be taken as a limitation on the embodiments of the systems and methods for employing alternate spellings for improving the recognition of rare words (herein after "ASIRW"). In one embodiment of an ASIRW, a speech recognition portion may include a "Custom Vocabulary" (CV), which allows a customer/user to submit a list of words which are likely to appear in an audio. The ASIRW may perform a translation model on each CV term to obtain a new tokenization. The system may build a new WFST, which includes the tokenizations for every word in the lexicon, plus the tokenizations for all the CV terms, plus the predicted tokenizations for the alternate spellings of the CV terms. Subsequently, the system runs with CTC (connectionist temporal classification) decoding and the new WFST (weighted finite-state transducer). In another embodiment, based on a custom vocabulary including user submitted words/phrases, the ASIRW builds identifying features for all CV and alternative spellings for all CV. Then the ASIRW recognizes speech using the identifying features of the CV and determines the greatest likelihood of recognized speech to corresponding transcribed text. In some alternatives, the ASIRW performs a tokenization of the CV. In another alternative, alternate spellings of the CV is created. In another alternative, the ASIRW uses a weighted finite-state transducer (WFST). The WFST includes language modeling information, including mappings from word pieces to full words. One objective of such systems is to create transcripts of spoken words from an audio file or a stream of media that are accurate and highly reflective of the actual speech.

In many embodiments, when referring to "Custom Vocabulary" (CV), any method of adding custom vocabulary words is included. The most common way may be user added words. These words may be out of the vocabulary of the automatic speech recognition (ASR) model and/or may sound like a common word but have a unique spelling. In many embodiments, users may use CV if the audio contains truly unique or rare terms that they believe not to be in the standard dictionary, which in many embodiments is a massive dictionary of 500 k+ words. Examples of good custom vocabulary terms include made-up words or words with unique spelling such as: sparkletini, timi, Ginnifer. In some configurations, examples of bad custom vocabulary terms that should not include are: Maybelline, e pluribus unum, orthostatic hypotension. In some alternatives, CV may be automatically loaded according to the expected discipline of use. For instance, the system may automatically load medical terminology in some scenarios, where medical personnel are likely to be using the system. It may be advantageous not to include words that may be confused with other words unless those words are likely to be used.

In one embodiment, an ASR model predicts pieces of text in units one to eight characters long called "word pieces". The ASR model has multiple modes of putting together the pieces of text predicted from an audio: connectionist temporal classification (CTC) decoding. CTC decoding guided with a weighted finite-state transducer (WFST), or WFSTs alone. IN many scenarios, WFST decoding is preferred. The WFST includes language modeling information, including mappings from word pieces to full words. This method of improving recognition of customer-specified words involves adding new mappings from word pieces to the relevant customer-specified words to the WFST.

In many embodiments, training the alternative spellings model is an important aspect of the ASIRW. In many configurations, a first step is generating training data. In many embodiments of this aspect, segments of ASR training data that likely to contain errors by taking utterances from the training set which contain at least one word appearing fewer than n times in our ASR training data are identified. In many configurations, WFST decoding is used. In some alternatives, ASR model is run using connectionist temporal classification (CTC) decoding on the audio segments from this subset of the training data.

In many embodiments, the data is additionally "cleaned." As part of this process, FSTAlign, an open-source tool for aligning sequences of text, the system aligns the ASR output text from step 1 with the corresponding human-transcribed reference text. FSTAlign identifies groups of contiguous errors (includes insertions, deletions, substitutions). An example of such a system may be found in U.S. patent application Ser. No. 17/069,462, entitled Systems and Methods for Aligning a Reference Sequence of Symbols With Hypothesis Requiring Reduced Processing and Memory, which is hereby incorporated by reference in its entirety. Next, the system extracts the error groups which involve substitution errors. The system identifies the most common X words in our data. The system removes all error pairs which involve any of the most common X words on the reference side.

In many embodiments, the ASIRW additionally includes a training step. The ASIRW trains a transformer-based encoder-decoder translation model on error pairs, using the reference text tokenized into characters as the input, and the ASR output text tokenized with the ASR model's tokenizer as output.

Once the setup phase is complete, the ASIRW may run speech recognition using the alternate spellings. As part of this process, when the user or customer submits a CV list, the ASIRW runs the translation model on each CV term to obtain a new tokenization. Then the system adds alternative spellings to the WFST. Then the ASIRW builds a new WFST, which includes the tokenizations for every word in the lexicon, plus the tokenizations for all the CV terms, plus the predicted tokenizations for the alternate spellings of the CV terms. The ASIRW runs ASR with this new WFST and in alternatives CTC.

FIG. 1 shows one embodiment of an ASIRW system/method. The ASIRW is typically implemented in computing systems and many times is conducted in a software as a service type application or plugin, that may either sit on top of a zoom or other online meeting or receive audio clips from a user. These are only examples of possible embodiments. As indicated above, an objective of the ASIRW is to integrate a custom vocabulary. In various scenarios, the user may provide custom vocabulary via a GUI or other interface. In step 5, the ASIRW receives a custom vocabulary. In step 10, the CV is tokenized. Tokenization is a process of breaking a word or phrase of the CV into smaller, identifiable parts, such that they may be searched for and manipulated by the ASIRW, including but not limited to providing such broken-down parts in a usable format to the WFST. Typically, in the case of a phrase, this involves dividing it into words, but in alternatives, the tokens created may be subparts of words or other identifiable aspects. Practically, in this configuration, a phrase may include multiple words and it may be efficient for the system to search for the first word in the phrase, and then the last word in the phrase. The tokenization may involve performing a translation model on the CV. In step 15 a new WFST is built based on the existing vocabulary and the additional custom vocabulary. In step 20, the WFST is built to include not only CV terms but also predicted tokenizations for alternative spellings. Once the custom WFST is created, the ASIRW system may now transcribe audio either from audio files provided or by piggybacking on a live media stream, such as an online conference.

Figure 2:
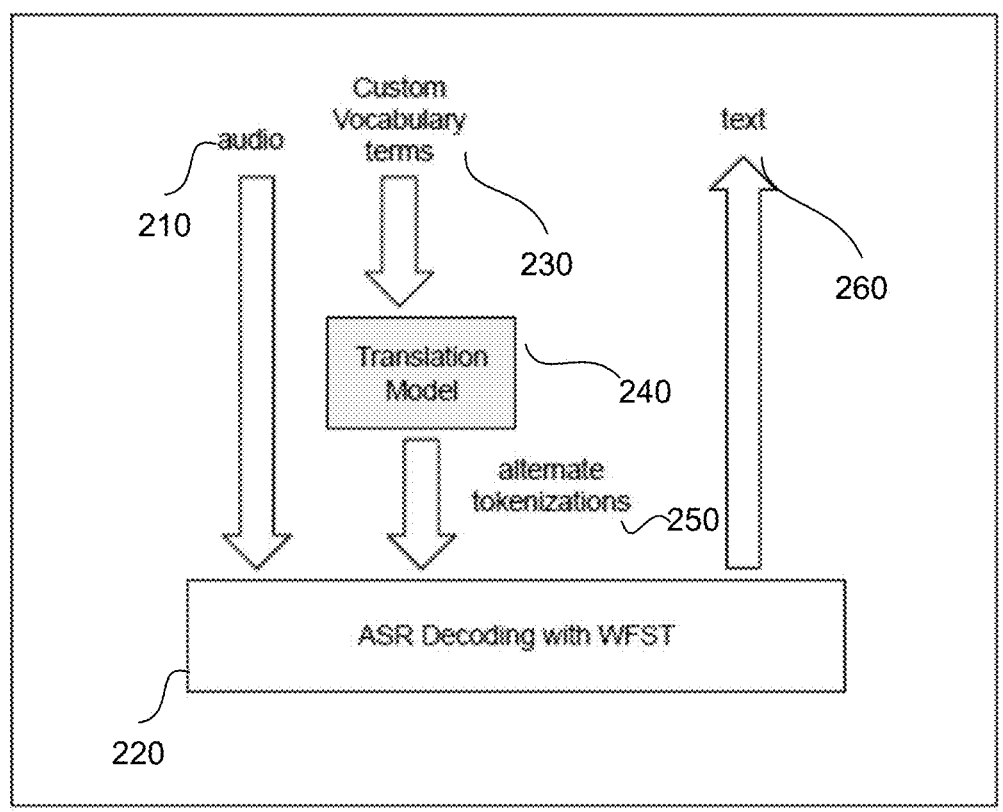
FIG. 2 shows a conceptual/block diagram for an embodiment of an ASIRW system/method.

FIG. 2 shows conceptual/block diagram for an embodiment of an ASIRW system/method that provides for alternative spellings. As previously discussed, a custom vocabulary 230 may be fed into a translation model 240 that provides for tokenization Additionally, in step 250 alternative tokenization is provided. These may be different spellings/alternative spelling for the same words. These new translation models and alternative tokenizations are provided to the ASR Decoding with WFST. Subsequently, audio 210 is provided to the ASR system and text 260 (transcription) is generated by the system.

Figure 3:
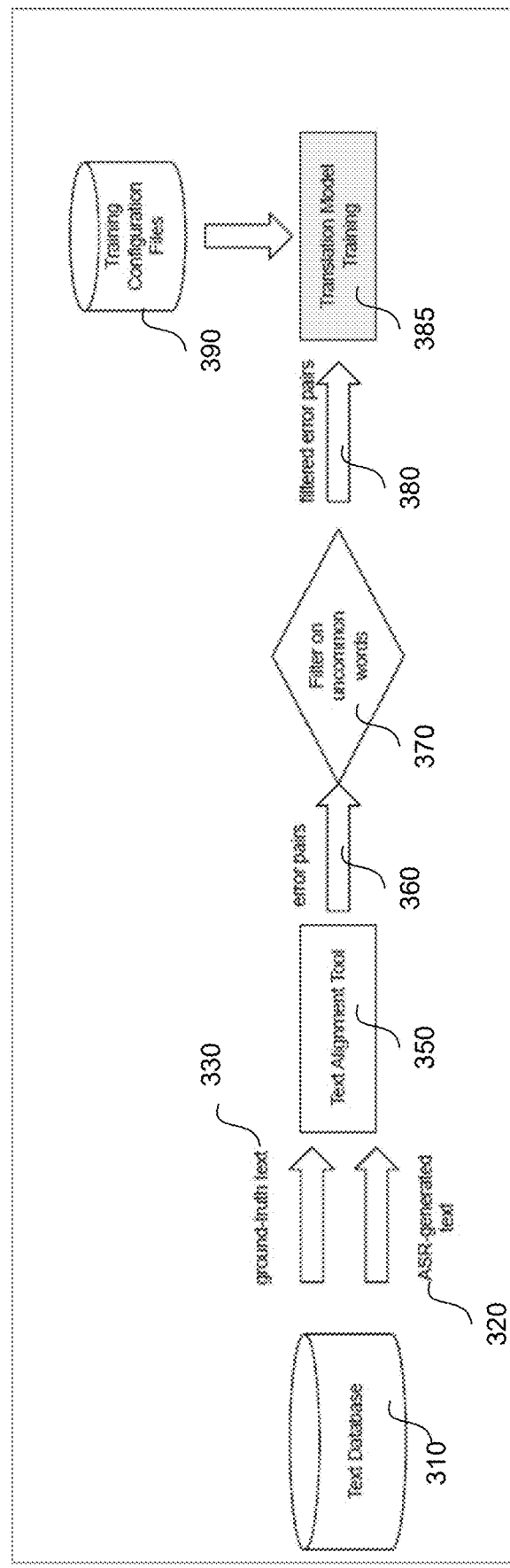
FIG. 3 shows conceptual/block diagram for an embodiment of an alternative spellings training system/method.

FIG. 3 shows conceptual/block diagram for an embodiment of an alternative spellings training system/method. First, a text database 310 is provided. This text database 310 includes at least two sets of text, resulting from the transcription of an audio signal including words. The first is the ground-truth text 330, resulting from a live user verifying and/or creating a transcription for the audio signal including words. The second is ASR-generated text 320, resulting from automatic speech recognition. More than one set of ASR-generated text 320 is possible for each part of the audio signal transcribed. This can result from multiple ASR results, multiple ASR engines, or other possibilities. Next, the at least two sets of text are aligned using text alignment tool 350. Error pairs 360 are generated based on the aligned text, by determining where the text sets do not match. Then the error pairs are filtered based on uncommon words, thereby determining possible alternative words that would not ordinarily be recognized via ASR. These filtered error pairs 380 are then added to the translation model training 385 along with the previously existing training configuration files 390. Thereby, a translation model is trained that can account for alternative spelling words.

In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Embodiments of the systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

In various instances, parts of the method may be implemented in modules, subroutines, or other computing structures. In many embodiments, the method and software embodying the method may be recorded on a fixed tangible medium.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A method of adding a custom vocabulary to a transcription system, the method comprising:
   receiving a custom vocabulary at an ASIRW module, the custom vocabulary is a list of words which are likely to appear in audio, the custom vocabulary list provided by a user to the ASIRW module, the user providing the audio to the transcription system;
   tokenizing the custom vocabulary with the ASIRW module;
   creating a new WFST (weighted finite-state transducer) with the ASIRW module;
   transcribing the audio using the new WFST with the ASIRW module.

2. The method of claim 1, wherein the tokenizing includes performing a translation model on each word of the custom vocabulary.

3. The method of claim 1, wherein the custom vocabulary includes phrases.

4. The method of claim 2, wherein the tokenizing includes creating predicted tokenizations for alternate spellings of the custom vocabulary.

5. The method of claim 4, wherein the new WFST includes tokenizations for every word in a lexicon, plus tokenizations for the custom vocabulary, plus the predicted tokenizations for the alternate spellings of the custom vocabulary.

6. The method of claim 5, wherein the creating the new WFST includes running CTC (connectionist temporal classification) decoding.

7. A system for adding a custom vocabulary to a transcription system, the system comprising:
   a ASIRW module executing code and configured to:
   receive a custom vocabulary at the ASIRW module, the custom vocabulary is a list of words which are likely to appear in audio, the custom vocabulary list provided by a user to the ASIRW module, the user providing the audio to the transcription system;
   tokenize the custom vocabulary with the ASIRW module;
   create a new WFST (weighted finite-state transducer) with the ASIRW module;
   transcribe the audio using the new WFST with the ASIRW module.

8. The system of claim 7, wherein the tokenizing includes performing a translation model on each word of the custom vocabulary.

9. The system of claim 7, wherein the custom vocabulary includes phrases.

10. The system of claim 8, wherein the tokenizing includes creating predicted tokenizations for alternate spellings of the custom vocabulary.

11. The system of claim 10, wherein the new WFST includes tokenizations for every word in a lexicon, plus tokenizations for the custom vocabulary, plus the predicted tokenizations for the alternate spellings of the custom vocabulary.

12. The system of claim 11, wherein the creating the new WFST includes running CTC (connectionist temporal classification) decoding.

13. A system for adding a custom vocabulary to a transcription system, the system comprising:
 a ASIRW module executing code and configured to:
  receive a custom vocabulary at the ASIRW module, the custom vocabulary is a list of words which are likely to appear in audio, the custom vocabulary list provided by a user to the ASIRW module, the user providing the audio to the transcription system;
  tokenize the custom vocabulary with the ASIRW module including performing a translation model on each word of the custom vocabulary;
  create a new WFST (weighted finite-state transducer) with the ASIRW module, wherein the new WFST includes tokenizations for every word in a lexicon, plus tokenizations for the custom vocabulary, plus the predicted tokenizations for the alternate spellings of the custom vocabulary;
  transcribe the audio using the new WFST with the ASIRW module.

14. A non-transitory digital storage medium having a computer program stored thereon to perform a method of adding a custom vocabulary to a transcription system, the method comprising:
 receiving a custom vocabulary at an ASIRW module, the custom vocabulary is a list of words which are likely to appear in audio, the custom vocabulary list provided by a user to the ASIRW module, the user providing the audio to the transcription system;
 tokenizing the custom vocabulary with the ASIRW module;
 creating a new WFST (weighted finite-state transducer) with the ASIRW module;
 transcribing the audio using the new WFST with the ASIRW module.

15. A method of alternative spelling training, the method comprising:
 providing a ground-truth text, the ground-truth text resulting from a live user verifying and/or creating a transcription for an audio signal including words;
 providing ASR-generated text;
 aligning the ground-truth text and the ASR-generated text with a text alignment tool;
 generating error pairs from the aligning;
 filtering the error pairs according to uncommon words to create filtered error pairs;
 adding the filtered error pairs to the translation model training along with the previously existing training configuration files, to create a trained translation model;
 using the trained translation model to generate a transcript from the audio signal.

16. The method of claim 15, wherein the ground-truth text results resulting from a live user creating a transcription for the audio signal including words.

17. The method of claim 15, wherein the ASR-generated text results from automatic speech recognition.

18. A system of alternative spelling training, the system comprising:
 an alternative spelling training module executing code and configured to:
  receive a ground-truth text, the ground-truth text resulting from a live user verifying and/or creating a transcription for an audio signal including words;
  receive ASR-generated text;
  align the ground-truth text and the ASR-generated text with a text alignment tool;
  generate error pairs from the aligning;
  filter the error pairs according to uncommon words to create filtered error pairs;
  add the filtered error pairs to the translation model training along with the previously existing training configuration files, to create a trained translation model;
  generate a transcript from the audio signal using the trained translation model.

* * * * *